United States Patent [19]

Baus

[11] Patent Number: 4,527,364
[45] Date of Patent: Jul. 9, 1985

[54] CORNER ASSEMBLY OF STRUCTURAL MEMBERS

[76] Inventor: Heinz G. Baus, 35 Wartbodenstrasse, CH-3626 Hünibach-Thun, Switzerland

[21] Appl. No.: 613,072

[22] Filed: May 22, 1984

[30] Foreign Application Priority Data

May 30, 1983 [DE] Fed. Rep. of Germany ....... 3319627

[51] Int. Cl.³ .......................... E04B 1/00; F16B 12/36
[52] U.S. Cl. ................... 52/127.7; 52/127.12; 52/284; 52/656; 403/231; 403/295
[58] Field of Search .................. 52/127.7, 127.12, 656, 52/657, 284; 403/295, 231, 7

[56] References Cited

U.S. PATENT DOCUMENTS 2,764,314  9/1956  Mautner ..................... 403/295 X
3,574,378  4/1971  Heywood ..................... 403/231

FOREIGN PATENT DOCUMENTS 307656    9/1972   Austria .
1225833   9/1966   Fed. Rep. of Germany ...... 403/231
2129858  12/1972   Fed. Rep. of Germany ...... 403/295
7437173.6 2/1975   Fed. Rep. of Germany .
7711771.6 9/1977   Fed. Rep. of Germany .
2738321   3/1978   Fed. Rep. of Germany ...... 403/295
1218379   5/1960   France ..................... 52/656
58800    11/1967   German Democratic Rep. .
350091   11/1960   Switzerland .

Primary Examiner—Alfred C. Perham
Assistant Examiner—Jean M. LaKemper
Attorney, Agent, or Firm—Schwartz, Jeffery, Schwaab, Mack, Blumenthal & Evans

[57] ABSTRACT

Corner assembly of a first and a second structural member disposed at an angle. Each member has an inner open ended chamber formed by spaced inner and outer webs of the members. A corner connector member has a first and a second leg snugly fitting into one of the chambers. The inner web of the first structural member has a pair of openings and the first leg has likewise a pair of openings which are in registry with the first openings transversely of the first leg. A pair of securing projections, solid with the inner web of the second structural member is formed with a pair of third openings. The securing projections extend through the first and second openings. The first leg has a fourth opening which extends lengthwise and in registry with the third opening. Locking bolts pass successively through the third openings and through the fourth openings, the latter being tapped so that the locking bolt threads therewith to secure the structural members and the connector member together to form the corner assembly.

12 Claims, 3 Drawing Figures

CORNER ASSEMBLY OF STRUCTURAL MEMBERS

The invention relates to a corner assembly of structural members, more particularly for use in a mirrored wardrobe. The assembly comprises a first and a second structural member, each having an inner chamber, and a corner connector having a first and a second leg inserted into the inner chambers of the first and second structural members.

Austrian Pat. No. 306,656 describes a device in which the outer surfaces of the corner connector legs have teeth. After insertion into the hollow chambers in the profiled rails, these teeth engage in teeth provided therein or to be fitted thereto. In this known device, the profiled rails are made of a thermoplastic synthetic material which makes the production of the teeth possible. However, the production of teeth inside the hollow chambers is relatively difficult, since suitable tools must be inserted in the chambers, whereupon the teeth are produced by heating. There are limits to the security and stability of the joint, especially since separate locking elements, or additional attachment elements are not provided between the profiled rails, the corner connectors, or the legs thereof.

Swiss Pat. No. 350,091 describes a corner connector of plate-shaped elements comprising interlocking guide surfaces on the longitudinal edges. These guide surfaces are a kind of tongue-and-groove joint, the plate elements being connected to each other by additional elements in the form of fittings and headed pins. A corner connector of this kind is scarcely suitable for uniting profiled rails having comparatively small end faces, nor does it provide satisfactory stability and dimensional accuracy. Furthermore, processing the end faces of the profiled rails to be united, comparably with that required for the known corner connector, would involve a considerable amount of labour.

East German Pat. No. 58 800 describes a plug-in-design metal cabinet, the lateral walls of which carry projections in the form of feet at the underside, the said feet engaging in a baseplate comprising slots so that, during assembly, relative displacement of the lateral wall in relation to the baseplate must take place. A corner connector of the type mentioned above cannot be used directly for this known metal cabinet, since it cannot permit the necessary relative movement.

German Utility Model No. 74 37 173 describes a cabinet of which the wall parts comprise, at their connecting edges, plug-in teeth and grooves, the production of which is time-consuming and involves considerable expenditure in tooling, since corresponding parts must be stamped out of the wall parts and must then be bent in a predetermined manner in a series of operations. Furthermore, in the case of profiled rails, which are usually made of extruded aluminum, bending is scarcely possible in practice.

Finally, German Utility Model No. 77 11 771 describes a kit for shelves or the like containing a baseplate and a series of fittings with multiple bends. An associated lateral wall also comprises a corresponding fitting. Production and assembly of the said fittings, baseplate and lateral wall are correspondingly costly.

It is therefore an object of the present invention to improve an assembly of this kind, which keeps material and production costs low and ensures high rigidity and dimensional stability at the joint between the profiled rails. The assembly is intended for long life and is to be noted for its high functional reliability. It is to be very stable, even when small profiled rails are used, and the mounting is to be simple. It is furthermore to ensure stable joints between the profiled rails produced at low assembly cost. Finally, the said assembly is to meet operating requirements and conditions.

Accordingly, the present invention as herein broadly claimed proposes a corner assembly of structural members comprising: a first and a second structural member, each having an inner chamber formed by spaced inner and outer webs of said structural members, said chambers being open ended along one edge of said structural members; said structural members being disposed at an angle to define therebetween an inward corner and an outward corner; a corner connector member having a first and a second leg defining said angle therebetween and each leg snugly fitting into one of said chambers; means defining at least one first opening through said inner web of said first structural member; means defining at least one second opening through said first leg in registry with said first opening and transversely of said first leg; at least one securing projection solid with said inner web of said second structural member; means defining a third opening through said securing projection; wherein said securing projection extends through said first and second openings; means defining a fourth opening extending lengthwise of said first leg and in registry with said third opening; and locking means including a locking member passing successively through said third opening of said securing projection and through said fourth opening of said first leg, suitable to connect and secure said structural members and connector member together to form said corner assembly.

"Structural member", as used here, is to be taken in a broad sense and may include profiled rails, partition walls or the like rigid structures, that are to be joined at an angle to one another. The expression "profiled rail" is used as an example only.

The corner assembly according to the invention is noted for its simple and inexpensive construction and provides dimensionally stable and accurate joints even when profiled rails of small dimensions are used. Since the securing projection is introduced into the openings in the corner connector member and the first profiled rail, this ensures specific alignment and locking. Furthermore, the securing projection is fixed to the corner connector member by means of a connecting element or locking member, more particularly a screw or grooved pin, thus producing a reliable and serviceable joint. The assembling cost is relatively low, since all that is needed is to pass the securing projection through the second profiled rail through the two openings in the connector member and the first profiled rail, and then to make the final rigid connection with the locking member. There is no need to mention that the assembly may be used in a frame consisting of four profiled rails, the ends of which are connected together in the manner taught by the invention. Although mirrored wardrobes are mentioned as a preferred application, the assembly according to the invention may also be used in other applications such as shower partition frames, windows or doors, for example, as explained above with respect to the expression "structural member".

The arrangement of the legs, inserted in the profiled rails, running at preferably right angles to each other provides positive and accurate alignment. Furthermore, according to the invention the locking member engages in the two openings in the leg and the projection, thus locking the corner connector member and the two profiled rails together. Since one leg of the connector member is inserted into the first profiled rail, and the securing projection is passed through the opening of the first profiled rail, this also ensures definite locking of the first profiled rail. The connector member is fixed directly to the second profiled rail by the locking member. Since the securing projection on the second profiled rail is also passed through the openings in the first profiled rail and the connector member, which is in turn pushed into the first profiled rail, this ensures an overall stable and dimensionally accurate joint between the two profiled rails at low cost.

In order to obtain a reliable joint even with small dimensions, the openings in the leg and in the projection of the second profiled rail should run substantially in the direction of the longitudinal axis of the first profiled rail. Even with a small connector member, the fact that the opening, the pin and the first profiled rail are parallel will ensure reliable locking, with no substantial weakening of the connector member itself and without affecting the load-carrying capacity thereof. In all applications of the invention it is of critical importance that simple introduction of a securing projection on the one profiled rail into the said aligned openings in the connector member and the other profiled rail shall ensure accurate and dimensionally stable alignment, and that a lasting and functional joint be provided by means of a screw or the like. It should also be said that the profiled rails themselves require no screw-passages extending over their entire lengths since, according to the invention, the connecting element is connected to the corner connector.

According to a particular feature, in order to ensure a joint free from play, the geometrical axis of the opening in the securing projection, in relation to the geometrical axis of the opening in the connector member, is at a predetermined distance from one front edge of the second profiled rail, the said front edge bearing against an internal surface of the first profiled rail or of the connector member. Preferably, this distance could be between 0.1 and 1.0 mm. During assembly, while the locking member is introduced, the second profiled rail is braced, in relation to the first profiled rail or even in relation to the connector member, as a result of the said distance. This is a particularly simple way of achieving tolerance equalization, and profiled rails thus assembled are connected together free of play. The preferred connector member made of plastic, and also the profiled rails, are sufficiently resilient and supple to allow the attachment elements to be introduced without difficulty.

In order to speed up assembly and keep down the cost thereof, the connecting element or locking member may be introduced from outside the profiled rails into the said openings. In this connection, the second profiled rail has on its outer side or web, at least in the vicinity of the securing projection, an edge which is set back in relation thereto. As a result of this, the openings are directly accessible from the outside, the connecting element or locking member can be inserted directly into the easily accessible openings, and may be anchored, bolted or otherwise secured therein. This is particularly important in the case of comparatively small mirrored wardrobes in confined spaces, where screws or the like have hitherto had to be fitted from the inside.

According to a preferred embodiment, in order to achieve rational and inexpensive production, the securing projection and/or the opening in the second profiled rail and/or the opening in the first profiled rail are produced by stamping. The profiled rails, cut to the required length, need be subjected to only one stamping operation and this takes little time. In this connection there are no excessive demands for dimensional accuracy, as in the case of mitred joints. The engagement in each other of the profiled rails on the one hand and of the connector member on the other hand, provides an extremely exact and dimensionally accurate joint.

In one particular embodiment, the projection and/or the inner webs of the profiled rails have their end edges at a predetermined distance from the outer webs of the other profiled rails. In other words, the inner webs each terminate inside each of the other profiled rails. There is no need for special treatment of the end edges, even after stamping. The outer webs of the assembly are visible from the outside, whereas the said end edges of the inner webs are hidden.

In one practical embodiment, a facing element is arranged in the corner between the outer webs. This facing element covers the edges of the outer webs, thus providing an overall harmonious and complete unit. The said facing element also covers the connecting element located behind the outer webs or inside the profiled rail.

In order to obtain a reliable joint with the facing element, the latter is secured in the corner area, either by means of a screw or the like or by means of a snap connection. The preferred snap connection, which comprises undercut catch elements or the like, provides rapid and simple assembly.

Embodiments of the invention are described hereinafter in greater detail in conjunction with the attached drawing wherein.

As mentioned above, reference is made below to the joining of profiled rails but the assembly may also be that of other similar structural members such as partition walls, panels or the like.

Figure 1:
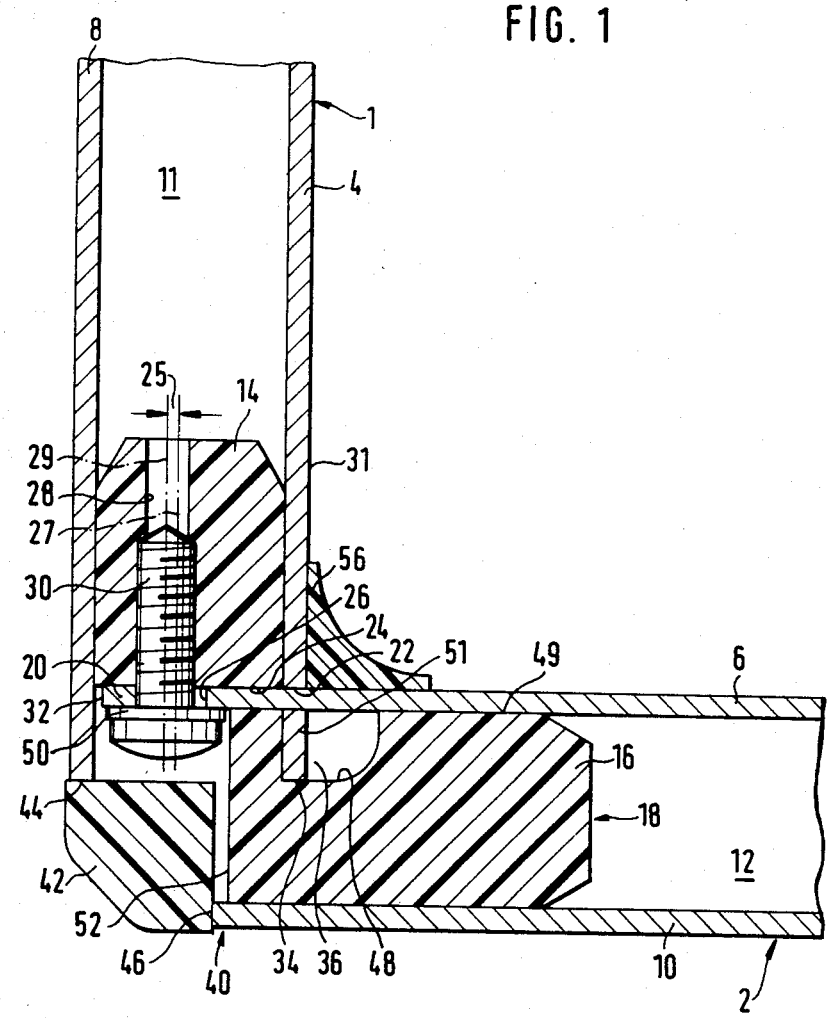
FIG. 1 is a cross-section through a corner assembly with two profiled rails.

FIG. 1 illustrates a first profiled rail 1 and a second profiled rail 2 disposed at right angles to each other. Rails 1 and 2 each have an inner web 4, 6 and an outer web 8, 10. Formed between the said webs are hollow inner chambers 11, 12 into which are inserted rectangularly arranged legs 14, 16 of a corner connector member 18.

The second profiled rail comprises a securing projection 20 which engages through a first opening 22 in inner web 4 of profiled rail 1. The said projection also passes through an aligned second opening 24 in leg 14 of the connector 18. Projection 20 also has, in the vicinity of hollow chamber 11 in profiled rail 1, a third opening 26 substantially in alignment with a fourth opening 28 in said leg 14. The geometrical axis 27 of opening 26 is arranged at a predetermined distance 25 to the geometrical axis 29 of opening 28 in connector 18, in the direction towards the inner surface 31 of the web 4 of the first profiled rail. This causes the two profiled rails and the connector member to be braced together, which is a simple way of equalizing production tolerance and ensuring a joint which is free from play. A connecting element or locking member 30, here in the form of a screw, is introduced into the said openings 26, 28. End edge 32 of projection 20, and furthermore end edge 34 of inner web 4 of first profiled rail 1, are each at a predetermined distance from outer webs 8 and 10. End edge 34 projects into a recess 36 in connector 18. Provided in the corner area, on the outward side 40, is a facing element 42 which bears, in part, against end edges 44, 46 of the two outer webs 8, 10.

In assembling, the leg 14 of connector 18 is inserted into inner chamber 11 in profiled rail 1. The end edge 34 rests at the bottom 48 of recess 36 of connector 18, thus providing definite alignment. Inner web 6 of the second profiled rail 2 rests directly upon inner surface 49 of leg 16 and faces opening 24 in connector 18. Opening 22 and lower end 51, projecting therefrom, of inner web 4 of the first profiled rail are designed accordingly, also for the purpose of providing bracing.

Second profiled rail 2 is then fitted by having projection 20 pushed through aligned openings 22, 24. Locking member 30 is now inserted, from outward side 40, into aligned openings 26, 28 in leg 14 of connector 18. In this case, locking member 30 is a screw which is simply threaded into opening 28 and is then secured against rotation by means of a spring washer. As shown, connector 18 comprises, in the outer corner area, a longitudinal groove 52 running at right angles to the plane of the drawing. Located in groove 52 is, on the one hand, the head of the screw 30 and, on the other hand, facing element 42. Like end edges 44, 46, longitudinal groove 52 is covered by facing element 42 which may be fitted by means of a screw. As an alternative, a snap connection may be provided, to allow the said facing element to be clipped into the corner.

Figure 2:
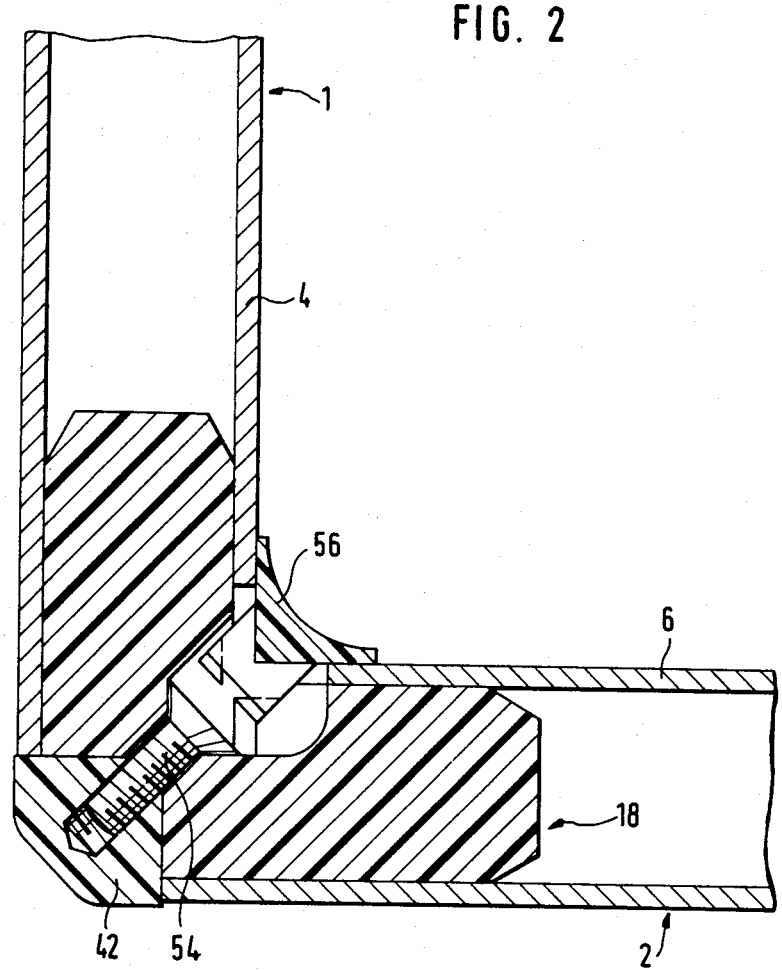
FIG. 2 is a cross-section through the assembly of FIG. 1, but in another plane.

FIG. 2 shows the assembly in another cross-sectional plane, facing element 42 now being secured to connector 18 by means of a screw. In this case, the above-mentioned recess 36 is slightly expanded, so that screw 54 may be fitted from the inside. Profiled rails 1, 2, and inner webs 4, 6 thereof, are shortened in the vicinity of screw 54 in the manner shown. The opening for screw 54 between inner webs 4, 6, among other things, is also covered by an inwardly rounded off inner facing element 56 which extends, according to the invention, over the entire depth of the profiled rails.

Figure 3:
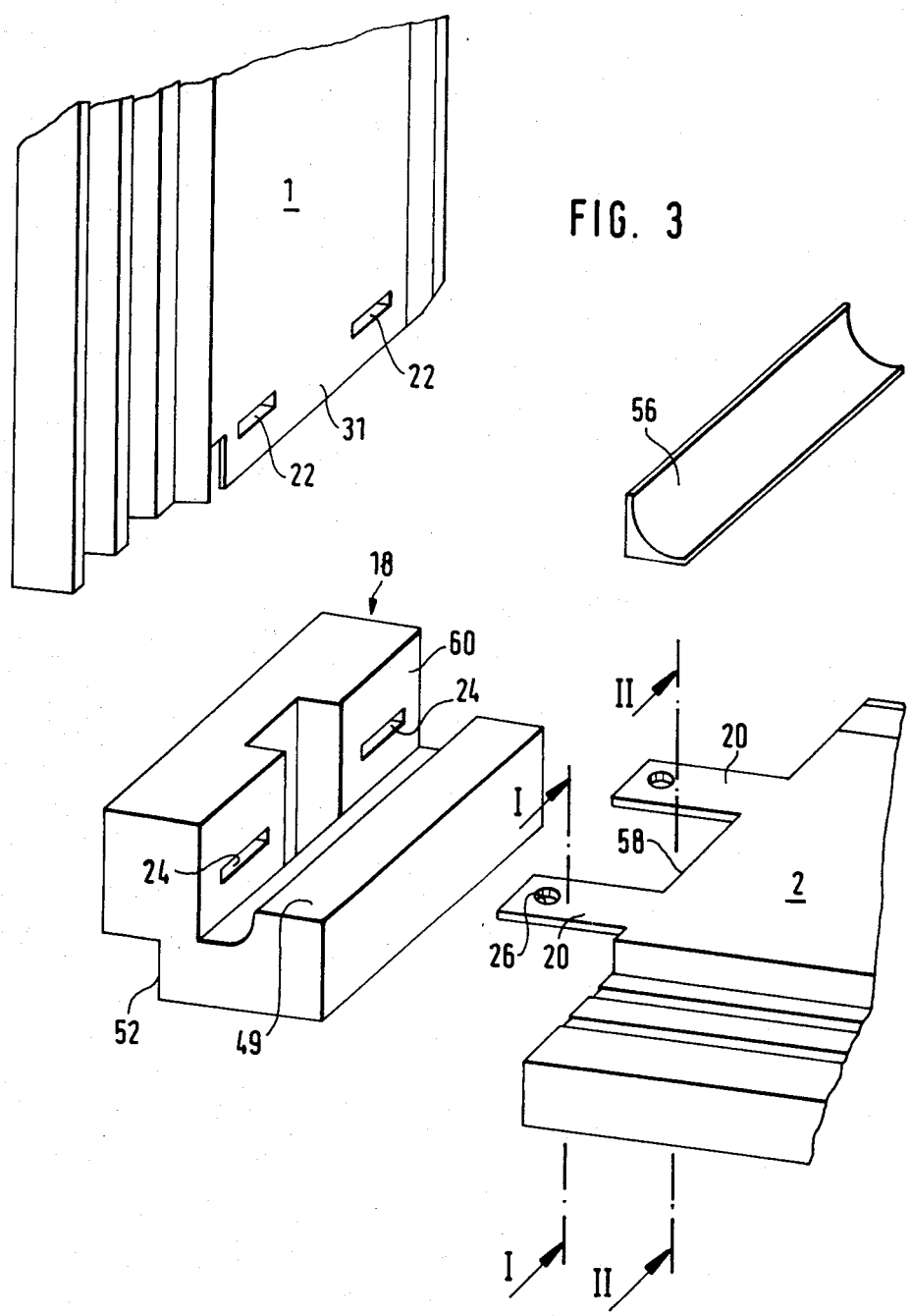
FIG. 3 is an exploded view of a slightly modified embodiment, the planes of FIGS. 1 and 2 being also indicated.

The exploded view of FIG. 3 shows the first profiled rail 1 with two first openings 22. Connector member 18 also has two second openings 24. Section lines I and II indicate the locations of the cross-sections according to FIGS. 1 and 2. Profiled rail 2 also comprises two securing projections 20 by means of which the joint, explained hereinbefore in detail, with profiled rail 1 is made, in cooperation with connector member 18. It should be noted, in particular, that connector member 18 extends over the entire width of both profiled rails 1 and 2. Since the legs of the connector member 18 engage in the hollow chambers in profiled rails 1 and 2 over a large width, definite alignment of the two profiled rails is assured. In the assembled condition, front edge 58 of second profiled rail 2 bears against inner surface 31 of the first profiled rail. As a result of the above-mentioned offset of the geometrical axes of third opening 26 and fourth opening 28 in connector member 18, the front edge 58 is pressed against the inner surface 31. The said distance is in the range between 0.1 and 1.0 approximately. Production tolerances etc. are thus easily equalized and a joint free of play is obtained. It is also possible, according to a variant not shown here, for front edge 58 to bear directly upon the inner surface 60 of connector member 18, the said distance from the opening being also present. It will be seen that this again provides bracing between the connector member 18 and profiled rail 2.

I claim:

1. A corner assembly of structural members comprising: a first and a second structural member, each having an inner chamber formed by spaced inner and outer webs of said structural members, said chambers being open ended along one edge of said structural members; said structural members being disposed at an angle to define therebetween an inward corner and an outward corner; a corner connector member having a first and a second leg defining said angle therebetween and each leg snugly fitting into one of said chambers; means defining at least one first opening through said inner web of said first structural member; means defining at least one second opening through said first leg in registry with said first opening and transversely of said first leg; at least one securing projection solid with said inner web of said second structural member; means defining a third opening through said securing projection; wherein said securing projection extends through said first and second openings; means defining a fourth opening extending lengthwise of said first leg and in registry with said third opening; and locking means including a locking member passing successively through said third opening of said securing projection and through said fourth opening of said first leg, suitable to connect and secure said structural members and connector member together to form said corner assembly.

2. A corner assembly as claimed in claim 1, wherein the axis of the fourth opening and that of the third opening run essentially in the direction of the longitudinal axis of the first leg of the connector member.

3. A corner assembly as claimed in claim 2, wherein said connector member has an outwardly open groove, on the side thereof facing said outward corner, and said securing projection enters into said groove flush with a surface of said groove formed by said first leg; said outer webs of said structural members terminating short of one another at said outward corner to create an opening for said groove to allow for the insertion of said locking member.

4. A corner assembly as claimed in claim 3, wherein the diameter of said third opening is larger than that of said fourth opening, and wherein the axis of said third opening is at a distance away from the axis of said fourth opening, with respect to said inner web of said first structural member, said distance being predetermined to cause said locking member to bear against the periphery of said third opening on the side of said third opening away from said inner web of said first structural member.

5. A corner assembly as claimed in claim 4, wherein the edge of said inner web of said second structural member, at said inward corner, bears against said inner web of said first structural member.

6. A corner assembly as claimed in claim 4, wherein the edge of said inner web of said second structural member, at said inward corner, bears against said first leg of said connector member.

7. A corner assembly as claimed in claim 4, wherein said securing projection is flat and said first and second openings are rectangular in cross-section to allow easy sliding therethrough of said securing projection.

8. A corner assembly as claimed in claim 4, wherein said connector member is formed with a recess at said inward corner, said recess defining a flat surface against which bears the inward surface of that part of said inner web of said first structural member that extends past said first opening.

9. A corner assembly as claimed in claim 3, further comprising a facing element closing said outward corner opening between said outer webs of said structural members.

10. A corner assembly as claimed in claim 9, including means removably securing said facing element and said structural members.

11. A corner assembly as claimed in claim 4, wherein said angle is a right angle.

12. A corner assembly as claimed in claim 4, wherein said locking means includes threads along said fourth opening and said locking member is a screw meshing with said threads and having a head pressing said securing projection against said first leg of said connector member.

* * * * *